(12) United States Patent
Hu et al.

(10) Patent No.: US 9,503,195 B2
(45) Date of Patent: Nov. 22, 2016

(54) WORKING POINT CONTROLLING DEVICE AND METHOD FOR APPLYING MZ MODULATOR

(71) Applicant: Wuhan Telecommunications Devices Co., Ltd., Wuhan, Hubei Province (CN)

(72) Inventors: Yi Hu, Wuhan (CN); Liang Cai, Wuhan (CN); Hui Zou, Wuhan (CN); Jin Yang, Wuhan (CN); Yang Kuang, Wuhan (CN)

(73) Assignee: WUHAN TELECOMMUNICATION DEVICES CO., LTD, Wuhan, Hubei Province (CN)

( * ) Notice: Subject to any disclaimer, the term of this patent is extended or adjusted under 35 U.S.C. 154(b) by 23 days.

(21) Appl. No.: 14/401,700

(22) PCT Filed: May 22, 2013

(86) PCT No.: PCT/CN2013/076041
§ 371 (c)(1),
(2) Date: Nov. 17, 2014

(87) PCT Pub. No.: WO2013/174255
PCT Pub. Date: Nov. 28, 2013

(65) Prior Publication Data
US 2015/0104195 A1 Apr. 16, 2015

(30) Foreign Application Priority Data

May 22, 2012 (CN) .......................... 2012 1 0159953

(51) Int. Cl.
*H04B 10/548* (2013.01)
*H04B 10/04* (2006.01)
(Continued)

(52) U.S. Cl.
CPC ........... *H04B 10/548* (2013.01); *G02F 1/0123* (2013.01); *H04B 10/50575* (2013.01); *G02F 2001/212* (2013.01)

(58) Field of Classification Search
CPC .......... H04B 10/548; H04B 10/50575; H04B 10/5053

USPC ........................................ 398/188, 183, 182
See application file for complete search history.

(56) References Cited

U.S. PATENT DOCUMENTS

2006/0127104 A1  6/2006  Harley et al.
2009/0115544 A1* 5/2009  Kershteyn ........... H04L 27/2075
                                                        332/103

(Continued)

FOREIGN PATENT DOCUMENTS

CN      201690436 U    12/2010
CN      102201868 A     9/2011
CN      102710336 A    10/2012

OTHER PUBLICATIONS

CN201690436U [Dec. 29, 2010, Wuhan Telecommunication Devices, English translation used in this Office Action].*

*Primary Examiner* — Oommen Jacob
(74) *Attorney, Agent, or Firm* — Muncy, Geissler, Olds & Lowe, P.C.

(57) ABSTRACT

Provided is a working point controlling device and method for applying MZ modulator, which includes: a light modulator; a transimpedance amplifier, transmits current outputted by PD of the modulator into voltage signal; a low-noise amplifier, detects low-frequency signal and amplifies the signal, in order to improve the signal/noise ratio; a high Q band-pass filter, detects error signal and amplifies the signal, in order to improve the signal/noise ratio; a first power level conditioning, performs power level condition on error signal of phase, in order that signal output meets A/D input rang; a micro processor, generates low-frequency signal and finishes software synchronization detection wave and ratio integration PI adjusting algorithm; a second power level conditioning, finishes D/A output voltage condition, in order that D/A output is able to meet direct current offset whole controlling range power voltage range of the light modulator. Applying present invention, the problems, that the hardware controlling circuit of current MZ modulator offset point is complex and controlling accuracy is not high, can be resolved.

10 Claims, 3 Drawing Sheets

(51) Int. Cl.
*H04J 14/00* (2006.01)
*H04B 10/50* (2013.01)
*G02F 1/01* (2006.01)
*G02F 1/21* (2006.01)

(56) References Cited

U.S. PATENT DOCUMENTS

2011/0043888 A1 2/2011 Lee
2011/0206384 A1* 8/2011 Zhou .................... H04B 10/572
398/192
2011/0267670 A1* 11/2011 Schemmann .... H04B 10/50575
359/239
2012/0288284 A1* 11/2012 Yoshida ............. H04B 10/5053
398/186
2014/0023368 A1* 1/2014 Bhandare ................ H04J 14/06
398/65
2015/0104195 A1* 4/2015 Hu ....................... H04B 10/548
398/188

* cited by examiner

WORKING POINT CONTROLLING DEVICE AND METHOD FOR APPLYING MZ MODULATOR

TECHNICAL FIELD

The present invention relates to an optical transmission network technology, particularly to a working point controlling device and method for applying Mach-Zahnder (MZ) modulator.

BACKGROUND OF THE INVENTION

In a high-speed and long-distance communication transmission, it is difficult to meet relevant requirements by intensity modulation. At present, during the long-distance transmission in the optical fiber communication field, the phase modulation technology is required. The present photoelectric phase modulation is generally implemented by Mach-Zahnder (MZ) modulators (hereinafter referred to as MZ modulators). However, heat generated during the running of the MZ modulators, the change of environmental temperature and ageing resulted from long-term running will influence the intensity of an electric field, and it is likely to change the characteristics of photoelectric modulators, so that the ideal control point of the modulators drifts from a preset point. As a result of drifting of the ideal control point, the curve amplitude and central position of the modulated optical signal change so that the optical eye diagram is degraded. When a serious drifting is caused, an MZ modulator will show strong nonlinearity. As a result, the maximum dynamic range of the optical communication connection will be reduced, the performance of the whole system will be degraded, and even the original information cannot be restored from the received optical signals if serious. Therefore, the stable control to working points of the light modulators has to be achieved. Shown in FIG. 1 is a schematic diagram of an existing working points of an modulator.

Currently a common controlling method for MZ modulator offset point is as follows: a low-frequency square signal is added into a modulation signal of the MZ, then this signal is separated from the output modulation signal, and finally the stability of the offset point is controlled through phase-locked amplification, as shown in FIG. 2. The controlling circuits become very complex due to the full-hardware control; meanwhile, the accuracy of the whole controlling loop is limited by the temperature stability of circuit devices.

SUMMARY OF THE INVENTION

In view of this, a major object of the present invention is to provide a working point controlling device and method for applying MZ modulator, and thus to solve the problems of existing complex hardware control circuit for a bias point of an MZ modulator and low control accuracy.

To achieve the above object, technical solutions of the present invention are implemented in such a way as follows.

A working point controlling device for applying MZ modulator is provided, including a light modulator for performing phase modulation to an input data signal, and further including a transimpedance amplifier, a low-noise amplifier, a high Q band-pass filter, a first power level conditioning, a micro processor and a second power level conditioning, wherein:

the transimpedance amplifier is configured to transmit current output by Photodetector (PD) of the modulator into voltage signal;

the low-noise amplifier is configured to detect and amplify a low-frequency signal in order to improve the signal/noise ratio of the system;

the high Q band-pass filter is configured to filter off the desired low-frequency signal to obtain a light detection signal of a low-frequency square signal to be input into the light modulator; and configured to detect and amplify an error signal in order to improve the signal/noise ratio of the system;

the first power level conditioning is configured to perform power level condition on error signal of phase so that the signal output falls into input range of Analog-to-Digital (A/D) conversion;

the micro processor is configured to generate low-frequency signal and finishes software synchronization detection wave and ratio integration Proportional Integral (PI) adjusting algorithm; and the second power level conditioning is configured to finish condition to the voltage output by Digital-to-Analog (D/A) conversion so that the D/A output is able to meet DC bias whole controlling range power voltage range of the light modulator.

Wherein, the micro processor is a singlechip containing on-chip 12 bits or more of A/D conversion and D/A conversion.

The phase polarity of the light detection signal output by the high Q band-pass filter reflects a position of the DC bias point relative to an optimal bias point, and the amplitude of the light detection signal is in direct proportion to a distance deviating from the optimal bias point.

That the light detection signal enters an on-chip A/D conversion circuit of the micro processor via the first power level conditioning to be synchronously detected via software inside the micro processor, specifically: by using information about the phase polarity and amplitude of the light detection signal, in the microprocessor, the synchronous detection for fundamental wave is performed on the light detection signal by means of software programming, to obtain an error AC signal to control the optimal offset point of the light modulator.

The micro processor selects an appropriate integration constant by means of software PI control to adjust the D/A conversion circuit, until a fast and stable DC signal, i.e., voltage at the optimal working point of the light modulator, is output.

A working point controlling method for applying MZ modulator is provided, comprising the following steps of:

A: generating a low-frequency square signal by a micro processor, inputting the low-frequency square signal into a DC bias pin of the MZ modulator, and superimposing the signal onto a high-speed data signal for light modulation;

B: converting light current output from a pin of PD into a voltage signal by a transimpedance amplifier, and then amplifying the voltage signal via a low-noise amplifier;

C: filtering off a low-frequency signal from the amplified signal via a high Q band-pass filter to obtain a light detection signal of a low-frequency square signal to be input into the light modulator;

D: letting the light detection signal enter an on-chip A/D conversion circuit of the micro processor via a first power level conditioning, and then performing synchronous detection via software inside the micro processor; and E: selecting, by the micro processor, an appropriate integration constant by means of software PI control to adjust a D/A conversion circuit, until a fast and stable DC signal, i.e., voltage at the optimal working point of the light modulator, is output.

The step D of performing synchronous detection via the micro processor is specifically:

D1: initializing at first, setting initial values of the A/D conversion circuit and the D/A conversion circuit of the micro processor, and controlling an Input/Output (IO) interface to transmit a low-frequency square signal;

D2: using the rising edge of the low-frequency square signal emitted by the IO interface as a trigger signal for sampling of a feedback signal, sampling for N times, performing sum accumulation to obtain an accumulated sum sum1 of the first half-cycle; meanwhile, using the falling edge of the low-frequency square signal emitted by the IO interface as a trigger signal for sampling of the feedback signal, sampling for N times, performing sum accumulation to obtain an accumulated sum sum2 of the second half-cycle; and D3: subtracting the accumulated sum sum1 of the first half-cycle from the accumulated sum sum2 of the second half-cycle to obtain a difference cz.

The method further includes a control flow of implementing the software PI algorithm, specifically:

D4: initializing and setting an initial value of D/A; with the error value cz obtained from the synchronous detection, by subtracting or adding the previously set D/A value from or to the synchronous detection error value cz/integration constant T, setting the resulted value as the current D/A value; and, resetting the software as the initial value if the resulted value goes beyond the range of settable numbers of the D/A.

The method further includes the following steps of:

performing PI adjusting operation according to the error value cz obtained from the synchronous detection, and outputting a D/A conversion value to control the voltage value of the DC bias pin of the modulator.

The working point controlling device and method for applying MZ modulator provided by the present invention have the following advantages:

The device is used for finding an ideal working point for the MZ modulator, including the control to a maximum point and a minimum point in a light characteristic curve; the whole device is controlled by a preset algorithm, so that signals in a light path can be effectively fed back and controlled in time; and, the device may accomplish the control to the working point of the modulator while powered on and lightened, and keep the relative phase of a light signal unchanged in the case of changed environment, so that the purpose of stable control is achieved. Therefore, the control system has advantages of simple implementation circuit, good control effect, high accuracy and fast response.

DETAILED DESCRIPTION OF THE PREFERRED EMBODIMENTS

The system and method provided by the present invention will be further described as below in details with reference to accompanying drawings by embodiments.

The present invention is to solve the generation of errors of the transmitted signal because the transmission curve of an MZ modulator drifts due to external factors. The method realizes feedback control to a bias working point of the modulator.

Figure 3:
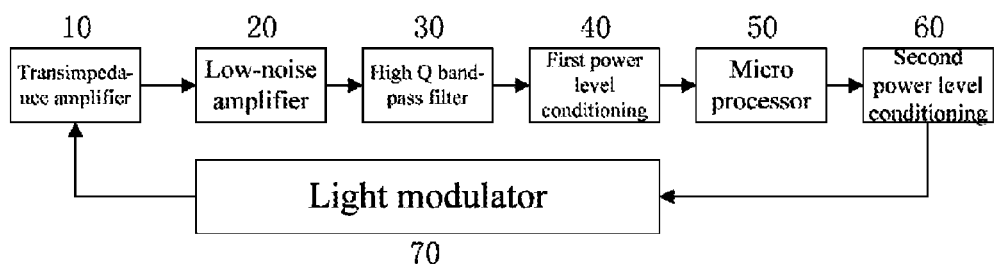
FIG. 3 is a functional block diagram of a working point controlling device for the MZ modulator according to the present invention.

FIG. 3 shows a functional block diagram of a working point controlling device for an MZ modulator according to the present invention. As shown in FIG. 3, the controlling device mainly includes seven parts: a transimpedance amplifier 10, a low-noise amplifier 20, a high Q band-pass filter 30, a first power level conditioning 40, a micro processor 50 and a second power level conditioning 60. According to the demands of practical applications, it is assumed that the MZ modulator is required to work at a null point hereinafter.

Figure 1:
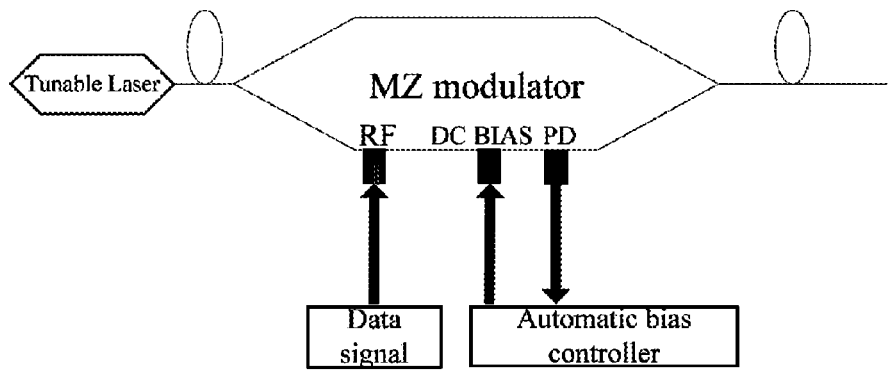
FIG. 1 is a schematic diagram of an existing working point controlling device for an MZ modulator.
Figure 2:
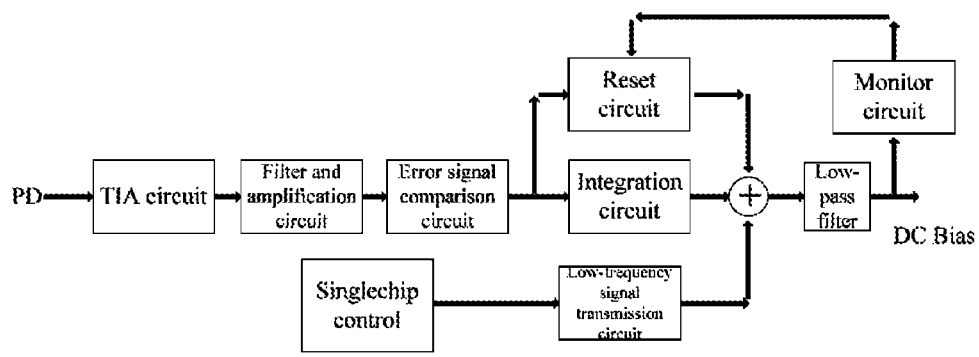
FIG. 2 is a schematic diagram of an overall design of an existing working point controlling device for an MZ modulator.

A low-frequency square signal is allowed to pass through a DC bias pin of the MZ modulator (referring to FIG. 1). Then, a light signal is detected by a Photodetector (PD) pin, and enters an Analog-to-Digital (A/D) converter of the micro processor 50 through the transimpedance amplifier 10, the low-noise amplifier 20, the high Q band-pass filter 30 and the first power level conditioning 40. The micro processor 50 performs synchronous detection and Proportional Integral (PI) adjustment to the sampled signal to control a Digital-to-Analog (D/A) converter to output a control signal. The control signal is output to the DC bias pin of the MZ modulator after passing through the second power level conditioning 60.

Here, the transimpedance amplifier 10 is configured to convert current output by the Photodetector (PD) of the light modulator into a voltage signal;

the low-noise amplifier 20 is configured to detect and amplify a low-frequency signal in order to improve the signal/-noise ratio of the system;

the high Q band-pass filter 30 is configured to filter off the desired low-frequency signal to obtain a light detection signal of a low-frequency square signal to be input into the light modulator; and configured to detect and amplify an error signal in order to improve the signal/noise ratio of the system;

the first power level conditioning 40 is configured to perform power level condition on the error signal of a phase so that the signal output falls into an input range of A/D conversion;

the micro processor 50, to save space, may be a singlechip containing on-chip 12 bits or more of A/D and D/A, which generates a low-frequency signal and then finishes software synchronous detection and PI adjusting algorithm;

the second power level condition 60 is configured to finishes D/A output voltage condition so that the D/A output is able to meet DC Bias whole controlling range power voltage range of the light modulator 70; and the light modulator 70 is configured to perform phase modulation to an input data signal.

Figure 4:
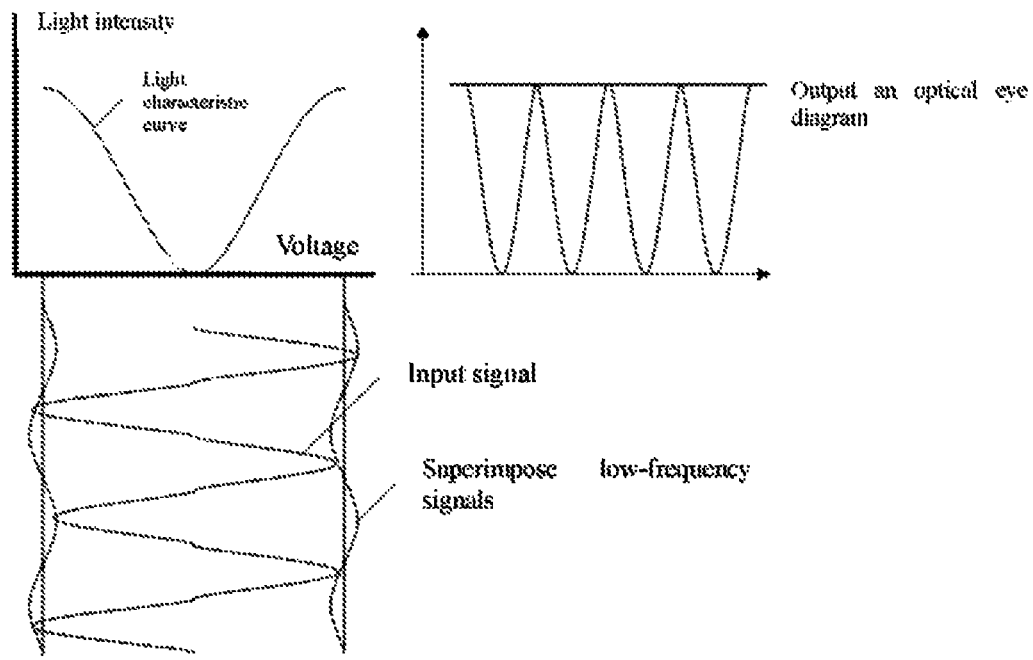
FIG. 4 is a schematic diagram of a phase modulation.

The implementation principle is as follows:

1) In a particular application, as there are relevant requirements on the time from a laser device emitting light to a modulator outputting a light signal, the system is required to find a working point and accomplish feedback control within several milliseconds. Finding a working point of a phase modulator is specifically as follows: generating a low-frequency square signal by the micro processor 50, inputting the low-frequency square signal into the DC bias pin of the MZ modulator, and superimposing the signal onto a high-speed data signal for light modulation together to obtain an optical eye diagram of the phase modulation, as shown in FIG. 4.

2) Light current from the PD pin is converted into a voltage signal by a transimpedance amplifier 10, and then amplified by the low-noise amplifier 20. The voltage signal includes a low-frequency part to be controlled, high-frequency noise and a DC component, so it is required to isolate the DC component and filter off the desired low-frequency part.

Figure 5:
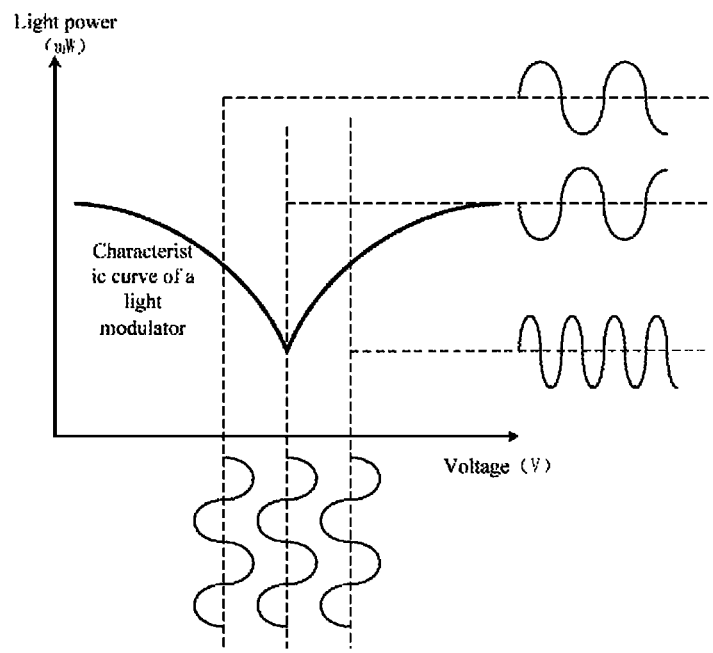
FIG. 5 is a schematic diagram of dithering.

3) A low-frequency signal is filtered off from the amplified signal by the high Q band-pass filter to obtain a light detection signal of a low-frequency square signal f to be input into the light modulator; the phase polarity of the light detection signal reflects a position (on a falling edge or a rising edge) of the DC bias point relative to an optimal bias point (peak point or null point), and the amplitude of the light detection signal is in direct proportion to a distance deviating from the optimal bias point. A minimum point is illustrated as example in FIG. 5.

4) The light detection signal enters the on-chip A/D of the micro processor 50 via the first power level conditioning 40, and is then synchronously detected via software inside the micro processor. The software synchronous detection is actually as follows: by using information about the phase polarity and amplitude of the light detection signal, in the microprocessor, the synchronous detection for fundamental wave is performed to the light detection signal by means of programming by software, to obtain an error AC signal to control the optimal offset point of the photoelectric modulator.

5) The micro processor 50 selects an appropriate integration constant by means of software PI control to adjust a D/A conversion circuit, until a fast and stable DC signal, i.e., voltage at the optimal working point of the modulator, is output.

Thus it can be seen that, by the above software algorithm processing, an error comparison circuit, an integration circuit, a reset circuit and a monitor circuit in the existing full-hardware technology are omitted, so that the complexity and cost of the external control circuits may be reduced while ensuring the accuracy, the stability and reliability of the control process are improved effectively, and it is advantageous to improve the performance of the whole system in modulating and sending light signals.

The specific flow is as follows: the built-in PD of the modulator converts a light signal into a current signal that contains a low-frequency signal component f input from the BIAS port of the modulator, then an appropriate transimpedance amplifier 10 is selected to convert the current signal into a voltage signal that can be processed, the voltage signal is allowed to pass through the low-noise amplifier 20 and the high Q band-pass filter 30 to obtain a pure low-frequency fundamental wave signal, and the low-frequency fundamental wave signal is finally regulated by the first power level conditioning 40 to a voltage range that can be processed by the on-chip A/D of the microprocessor.

Meanwhile, the micro processor 50 generates a low-frequency square signal, and the low-frequency square signal is then converted by the second power level conditioning 60 into a low-frequency square signal having a small amplitude. The DC signal output by the control D/A of the micro processor 50 is converted by the second power level conditioning 60 to be within a DC bias full-control range of the modulator. Meanwhile, the low-frequency square signal having a small amplitude and the DC voltage regulated by D/A are superimposed in the second power level conditioning 60.

There are some requirements for a square signal: first, the amplitude of a dither signal cannot be too small so that the signal cannot be detected when passing through the PD, or, too large or otherwise the data signal will be influenced, generally 1% smaller than the amplitude of the data signal; second, the frequency of a low-frequency signal should be very small so that the low-frequency signal will not influence the spectrum of the modulation signal and does not exceed the software processing speed of the microprocessor, however, the frequency of the low-frequency signal cannot be too low to the extent that it cannot be distinguished from the low-frequency noise, generally several KHz to ensure a good signal/noise ratio; and third, to ensure the synchronous detection by software, a square signal having a duty ratio of 50% is selected as the low-frequency signal, and the more symmetrical, the better.

Figure 6:
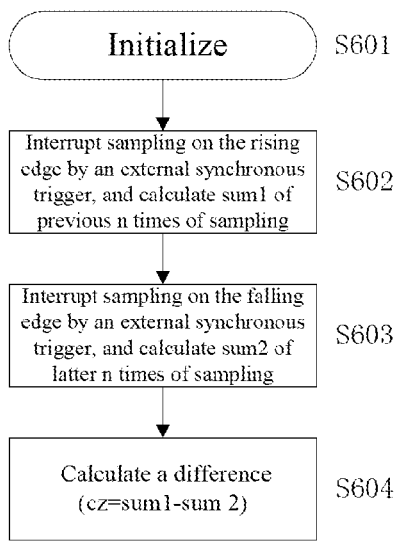
FIG. 6 is a flowchart of a controlling process of software synchronous detection according to an embodiment of the present invention.

FIG. 6 is a flowchart of a controlling process of software synchronous detection according to an embodiment of the present invention, specifically including the following steps:

S601: Initialization is performed at first, initial values of the A/D and the D/A of the microprocessor are set, and an Input/Output (IO) interface is controlled to transmit a low-frequency square signal.

S602: The rising edge of the square signal emitted by the IO interface is used as a trigger signal for sampling of a feedback signal, sampling is performed for N times, and sum accumulation is performed to obtain sum1. Simultaneously, S603 is carried out.

S603: The falling edge of the square signal emitted by the IO interface is used as a trigger signal for sampling of the feedback signal, sampling is performed for N times, and sum accumulation is performed to sum2.

S604: The accumulated sum sum1 of the first half-cycle is subtracted from the accumulated sum sum2 of the second half-cycle to obtain a difference cz.

Figure 7:
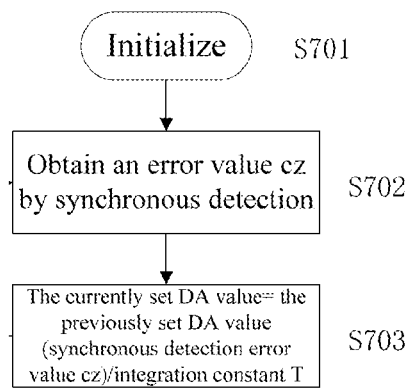
FIG. 7 is a flowchart of a software PI algorithm according to an embodiment of the present invention.

FIG. 7 is a flowchart of a software PI algorithm according to an embodiment of the present invention, specifically including the following steps:

S701: Initialization is performed, and an initial value of D/A is set.

S702: An error value cz is obtained by the synchronous detection.

S703: by subtracting or adding the previously set D/A value from or to the synchronous detection error value cz/integration constant T, the resulted value is set as the current D/A value; and, the software is reset as the initial value if the resulted value goes beyond the range of settable numbers of the D/A. The subtraction and addition determines whether a null point or a peak point is to be found.

In addition, the device provided according to this embodiment can also select an appropriate integration constant T according to the real-time performance and accuracy. The integration constant T used in each control process is not limited to a fixed value, and a larger integration constant may be determined according to the range of the synchronous detection cz in order to acquire a more stable effect and further to improve the accuracy of the finally determined bias point.

Figure 8:
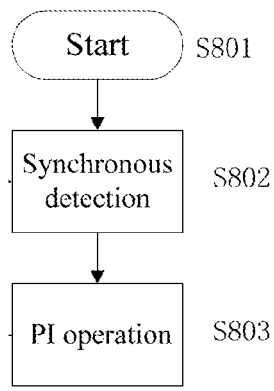
FIG. 8 is a flowchart of a process of performing control by an offset point controlling device for the MZ modulator according to the present invention.

FIG. 8 is a flowchart of a process of performing control by an offset point controlling device for an MZ modulator according to the present invention, including the following steps of:

S801: Initialization is performed, initial values of the A/D and D/A of the microprocessor are set, an IO interface is controlled to transmit a low-frequency square signal, and a symbol for finding a null point and a peak point is set.

S802: The synchronous detection is implemented by software to obtain an error value cz.

S803: PI adjusting operation is performed according to the error value cz obtained by the synchronous detection, and a D/A conversion value is output to control the voltage value of the DC bias pin of the modulator.

To ensure that the MZ modulator can work for a long time at high accuracy, S802 and S803 may be repeated ceaselessly or repeated for a certain time of delay.

Through the foregoing description of the implementation method, an ordinary person skilled in the art should clearly understand that the present invention may be implemented by means of software and necessary hardware platform. On this basis, the contribution of the technical solutions of the present invention to the background art may be embodied in a form of software products. The software products may be stored in a storage medium, such as ROM/RAM, a magnetic disc, an optical disc and the like, and include a number of instructions for enabling a computer equipment (a personal computer, a server or a network equipment) to implement the method described in various embodiments or some parts of the embodiments of the present invention.

In conclusion, the forgoing description just shows preferred embodiments of the present invention, and is not intended to limit the protection scope of the present invention.

What is claimed is:

1. A working point controlling device to be used with an MZ modulator, comprising a light modulator for performing phase modulation to an input data signal, and further comprising a transimpedance amplifier, a low-noise amplifier, a high Q band-pass filter, a first power level conditioning, a micro processor and a second power level conditioning that are connected in an order, wherein:

the transimpedance amplifier is configured to convert current output by a Photodetector (PD) of the MZ modulator into a voltage signal;

the low-noise amplifier is configured to detect and amplify a low-frequency signal component of the voltage signal in order to improve the signal/noise ratio of the system;

the high Q band-pass filter is configured to filter off a desired low-frequency signal from the amplified low-frequency signal component of the voltage signal to obtain a light detection signal of a subsequent low-frequency square signal to be input into the MZ modulator; and configured to detect and amplify an error signal in order to improve the signal/noise ratio of the system;

the first power level conditioning is configured to perform power level condition on the error signal of a phase so that the signal output falls into an input range of Analog-to-Digital (A/D) conversion;

the micro processor is configured to generate the subsequent low-frequency square signal and to perform software synchronous detection and Proportional Integral (PI) adjusting algorithm; and the second power level conditioning is configured to perform condition to the voltage output by Digital-to-Analog (D/A) conversion so that the D/A output is able to meet DC bias whole controlling range power voltage of the MZ modulator and to convert the generated subsequent low-frequency square signal into a low-frequency square signal having small amplitude and the DC signal output into a DC bias full-control range of the MZ modulator and superimpose the low-frequency square signal having small amplitude and the DC bias full-control range of the MZ modulator.

2. The working point controlling device according to claim 1, wherein the micro processor is a singlechip containing on-chip 12 bits or more of A/D conversion and D/A conversion.

3. The working point controlling device according to claim 1, wherein the phase polarity of the light detection signal output by the high Q band-pass filter reflects a position of the DC bias point relative to an optimal bias point, and the amplitude of the light detection signal is in direct proportion to a distance deviating from the optimal offset point.

4. The working point controlling device according to claim 3, wherein the light detection signal enters an on-chip A/D conversion circuit of the micro processor via the first power level conditioning to be synchronously detected via software inside the micro processor, specifically: by using information about the phase polarity and amplitude of the light detection signal, in the microprocessor, the synchronous detection for fundamental wave is performed to the light detection signal by means of programming by software, to obtain an error AC signal to control the optimal offset point of the MZ modulator.

5. The working point controlling device according to claim 1, wherein the micro processor selects an appropriate integration constant by means of software PI control to adjust the D/A conversion circuit, until a fast and stable DC signal, i.e., voltage at the optimal working point of the MZ modulator, is output.

6. A working point controlling method to be used with an MZ modulator, comprising the following steps of:

A: generating a current low-frequency square signal by a micro processor, inputting the current low-frequency square signal into a DC bias pin of the MZ modulator, and superimposing the inputted current low-frequency square signal onto a high-speed data signal for light modulation;

B: converting light current output from a pin of a PD into a voltage signal by a transimpedance amplifier, and then amplifying a low-frequency signal component of the voltage signal by a low-noise amplifier;

C: filtering off a low-frequency signal from the amplified low-frequency signal component of the voltage signal by a high Q band-pass filter to obtain a light detection signal of a subsequent low-frequency square signal to be input into the MZ modulator and detecting and amplifying an error signal in order to improve the signal/noise ratio of the system;

D: performing power level condition on the error signal of a phase by a first power level conditioning so that the signal output falls into an input range of Analog-to-Digital (A/D) conversion, and letting the light detection signal enter an on-chip A/D conversion circuit of the micro processor and then performing synchronous detection and Proportional Integral (PI) adjusting algorithm via software inside the micro processor;

E: selecting, by the microprocessor, an appropriate integration constant by a software PI control to adjust a Digital-to-Analog (D/A) conversion circuit, until a fast and stable DC signal is output;

F: generating the subsequent low-frequency square signal; and

G: converting the generated subsequent low-frequency square signal into a a low-frequency square signal having small amplitude and the DC signal output into a DC bias full-control range of the MZ modulator by a second power level conditioning and superimposing the low-frequency square signal having small amplitude and the DC bias full-control range of the MZ modulator.

7. The working point controlling method according to claim 6, wherein the step D of performing synchronous detection via the microprocessor is specifically:

D1: initializing at first, setting initial values of the A/D conversion circuit and the D/A conversion circuit of the micro processor, and controlling an Input/Output (TO) interface to transmit a low-frequency square signal;

D2: using the rising edge of the low-frequency square signal emitted by the 10 interface as a trigger signal for sampling of a feedback signal, sampling for N times, performing sum accumulation to obtain an accumulated sum sum1 of the first half-cycle; meanwhile, using the falling edge of the low-frequency square signal emitted by the IO interface as a trigger signal for sampling of the feedback signal, sampling for N times, performing sum accumulation to obtain an accumulated sum sum2 of the second half-cycle; and D3: subtracting the accumulated sum sum1 of the first half-cycle from the accumulated sum sum2 of the second half-cycle to obtain a difference cz.

8. The working point controlling method according to claim 6, wherein the method further comprises a control flow of implementing the software PI algorithm, specifically:

D4: initializing and setting an initial value of D/A; with the error value cz obtained from the synchronous detection, by subtracting or adding the previously set D/A value from or to the synchronous detection error value cz/integration constant T, setting the resulted value as the current D/A value; and, resetting the software as the initial value if the resulted value goes beyond the range of settable numbers of the D/A.

9. The working point controlling method according to claim 6, further comprising the following steps of:

performing PI adjusting operation according to the error value cz obtained from the synchronous detection, and outputting a D/A conversion value to control the voltage value of the DC bias pin of the MZ modulator.

10. The working point controlling method according to claim 6, wherein the fast and stable DC signal is a voltage at the optimal working point of the MZ modulator.

* * * * *